(12) United States Patent
Yoshino et al.

(10) Patent No.: US 10,487,870 B2
(45) Date of Patent: Nov. 26, 2019

(54) FOIL BEARING

(71) Applicant: NTN CORPORATION, Osaka (JP)

(72) Inventors: Masato Yoshino, Mie (JP); Hiroki Fujiwara, Mie (JP); Mitsuo Kawamura, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/780,016

(22) PCT Filed: Nov. 16, 2016

(86) PCT No.: PCT/JP2016/083895
§ 371 (c)(1),
(2) Date: May 30, 2018

(87) PCT Pub. No.: WO2017/094501
PCT Pub. Date: Jun. 8, 2017

(65) Prior Publication Data
US 2018/0355909 A1  Dec. 13, 2018

(30) Foreign Application Priority Data

Dec. 1, 2015 (JP) .................................. 2015-234626

(51) Int. Cl.
*F16C 17/02* (2006.01)
*F16C 27/02* (2006.01)
(Continued)

(52) U.S. Cl.
CPC .......... *F16C 17/024* (2013.01); *F01D 25/164* (2013.01); *F01D 25/168* (2013.01);
(Continued)

(58) Field of Classification Search
CPC .... F16C 17/024; F16C 17/042; F16C 37/002; F16C 43/02; F16C 2360/23; F16C 27/02;
(Continued)

(56) References Cited

U.S. PATENT DOCUMENTS 3,434,761 A    3/1969 Marley
3,635,534 A *  1/1972 Barnett ................. F16C 17/024
                                                    384/106
(Continued)

FOREIGN PATENT DOCUMENTS

CN      102927124        4/2015
DE         3442155 A1 *  5/1986 ............ F16C 17/024
(Continued)

OTHER PUBLICATIONS

International Preliminary Report on Patentability and Written Opinion of the International Searching Authority dated Jun. 5, 2018 in International (PCT) Application No. PCT/JP2016/083895.
(Continued)

*Primary Examiner* — Marcus Charles
(74) *Attorney, Agent, or Firm* — Wenderoth, Lind & Ponack, L.L.P.

(57) ABSTRACT

The present invention provides a foil bearing (10), including: a top foil portion (Tf); and a back foil portion (Bf), which is arranged on a back of the top foil portion (Tf), and is configured to elastically support the top foil portion (Tf), wherein the back foil portion (Bf) includes: an intermediate portion (23) being flat; first projecting portions (21) projecting on a front side of the intermediate portion (23); and second projecting portions (22) projecting on a back side of the intermediate portion (23).

20 Claims, 10 Drawing Sheets

(51) Int. Cl.
*F16C 43/02* (2006.01)
*F01D 25/16* (2006.01)

(52) U.S. Cl.
CPC .............. *F16C 27/02* (2013.01); *F16C 43/02* (2013.01); *F16C 2360/23* (2013.01)

(58) Field of Classification Search
CPC ...... F16C 17/26; F01D 25/164; F01D 25/166; F01D 15/168; Y10T 29/49639
USPC .................................................. 384/103–106
See application file for complete search history.

(56) References Cited

U.S. PATENT DOCUMENTS

| | | | | |
|---|---|---|---|---|
| 4,195,395 A | * | 4/1980 | Silver | F16C 17/024 |
| | | | | 29/898.02 |
| 4,668,106 A | | 5/1987 | Gu | |
| 4,682,900 A | | 7/1987 | Gu | |
| 4,701,060 A | * | 10/1987 | Gu | F16C 17/024 |
| | | | | 384/106 |
| 4,818,123 A | | 4/1989 | Gu | |
| 2014/0219590 A1 | * | 8/2014 | Omori | F16C 32/06 |
| | | | | 384/106 |

FOREIGN PATENT DOCUMENTS

| | | | | | |
|---|---|---|---|---|---|
| EP | 0 228 251 | | 7/1987 | | |
| EP | 2455629 A1 | * | 5/2012 | ............ | F16C 17/024 |
| GB | 703563 | | 2/1954 | | |
| JP | 58-191319 | | 11/1983 | | |
| JP | 1-242815 | | 9/1989 | | |
| JP | 1-242816 | | 9/1989 | | |
| JP | 2003-247542 | | 9/2003 | | |
| JP | 2004190761 A | * | 7/2004 | .............. | F16C 17/02 |
| JP | 2013-087789 | | 5/2013 | | |
| JP | 2014037857 A | * | 2/2014 | ............ | F16C 17/024 |
| JP | 5644547 B2 | * | 12/2014 | .............. | F16C 43/02 |

OTHER PUBLICATIONS

International Search Report dated Feb. 14, 2017 in International (PCT) Application No. PCT/JP2016/083895.
Extended European Search Report dated Aug. 13, 2019 in European Patent Application No. 16870439.3.

* cited by examiner

DENSE (HIGH RIGIDITY) ←――――――――→ SPARSE (LOW RIGIDITY)

FOIL BEARING

The present application is a U.S. National Phase Application of International (PCT) Application No. PCT/JP2016/083895 filed on Nov. 16, 2016.

TECHNICAL FIELD

The present invention relates to a foil bearing.

BACKGROUND ART

There has been known a foil bearing as a bearing which is less liable to cause a whirl and enables management of a gap width of a bearing gap to be performed easily even under an environment in which a temperature change is large. The foil bearing has a bearing surface formed of flexible metal thin plates (foils) having a low rigidity with respect to bending, and is configured to support a load by allowing flexure of the bearing surface. Such a configuration of the foil bearing enables automatic adjustment of a bearing gap to an appropriate width in accordance with, for example, an operation condition. For example, in Patent Literature 1 described below, there is disclosed a foil bearing of a so-called bump type as an example of a radial foil bearing configured to support a radial load.

CITATION LIST

Patent Literature 1: JP 2013-87789 A

SUMMARY OF INVENTION

Technical Problem

The foil bearing described in Patent Literature 1 includes a cylindrical top foil, back foils (bump foils) configured to elastically support the top foil, and a bearing holder to which the top foil and the back foils are mounted. In this bump-type foil bearing, the back foils are elastically deformed when the top foil receives a load, thereby allowing flexure of the top foil.

Incidentally, as illustrated in FIG. 23, the back foils of the bump-type foil bearing each have a corrugated plate shape in which protruding portions 200 extending in an axial direction (arrow direction) are arrayed in a circumferential direction. When the back foils are elastically deformed, the back foils are deformed through stretching of each protruding portion 200. However, the deformation resistance given at the time of deformation is large, and the back foils as a whole have a high rigidity, with the result that the top foil tends to be poor in pliability. When the top foil is poor in pliability, the automatic adjustment function for the bearing gap is impaired, which may result in defects such as being liable to cause contact between a shaft and the top foil.

Therefore, the present invention has an object to provide a foil bearing in which a top foil portion is enhanced in pliability.

Solution to Problem

The present invention has been made in order to solve the above-mentioned problem, and according to one embodiment of the present invention, there is provided a foil bearing, comprising: a top foil portion having a bearing surface opposed to a shaft to be supported; and a back foil portion, which is arranged on a back of the top foil portion, and is configured to elastically support the top foil portion, wherein the foil bearing is configured to support relative rotation of a shaft in a non-contact state with a fluid film generated in a bearing gap between the shaft and the bearing surface, wherein the back foil portion comprises: an intermediate portion being flat; first projecting portions projecting on a front side of the intermediate portion; and second projecting portions projecting on a back side of the intermediate portion.

With this configuration, fluid pressure generated in the bearing gap during an operation of the bearing causes a compression force in an action direction of the fluid pressure (corresponding to a radial direction in a radial bearing, and an axial direction in a thrust bearing) to act on the back foil portion through the top foil portion. The intermediate portion of the back foil portion is low in rigidity with respect to the compression force. Therefore, when the compression force is applied to the back foil portion, the intermediate portion first deforms to absorb the compression force. Thus, as compared to a back foil portion of an existing bump-type foil bearing having no such flat portion, the rigidity of the back foil portion as a whole is reduced, thereby being capable of enhancing the pliability of the bearing surface.

It is preferred that the first projecting portions and the second projecting portions be arrayed intermittently at least in a relative rotation direction of the shaft and in a direction orthogonal to the relative rotation direction along the bearing surface. With this configuration, when the back foil portion is deformed, relative movement is allowed between the adjacent projecting portions of the same kind in the two directions. Therefore, the pliability of the bearing surface can further be enhanced.

When the back foil portion comprises a high-density region in which the first projecting portions and the second projecting portions are densely distributed and a low-density region in which the first projecting portions and the second projecting portions are sparsely distributed, the rigidity at parts of the back foil portion as well as the rigidity at parts of the bearing surface can be controlled.

When the first projecting portions, the second projecting portions, or both the first projecting portions and the second projecting portions comprise large projecting portions each having a large projection amount from the intermediate portion and small projecting portions each having a small projection amount from the intermediate portion, non-linearity is given to the resiliency characteristics of the back foil portion. Therefore, the resiliency characteristics of the back foil portion can be diversified.

When the intermediate portion has an opening portion, the intermediate portion becomes more pliable, thereby being capable of reducing the rigidity of the back foil portion.

When the back foil portion has a maximum rigidity at a position corresponding to a maximum pressure generating portion in the bearing gap, the bearing surface also has a maximum rigidity at the maximum pressure generating portion. Therefore, an escape of the fluid caused by the deformation of the bearing surface can be prevented, thereby being capable of stably maintaining a floating force on the shaft.

Advantageous Effects of Invention

As described above, according to the present invention, the pliability of the top foil portion can be enhanced. With this, the automatic adjustment function for the bearing gap can suitably be exerted, thereby being capable of reliably preventing the contact between the shaft and the top foil portion.

DESCRIPTION OF EMBODIMENTS

Now, description is made of embodiments of the present invention with reference to the drawings.

Figure 1:
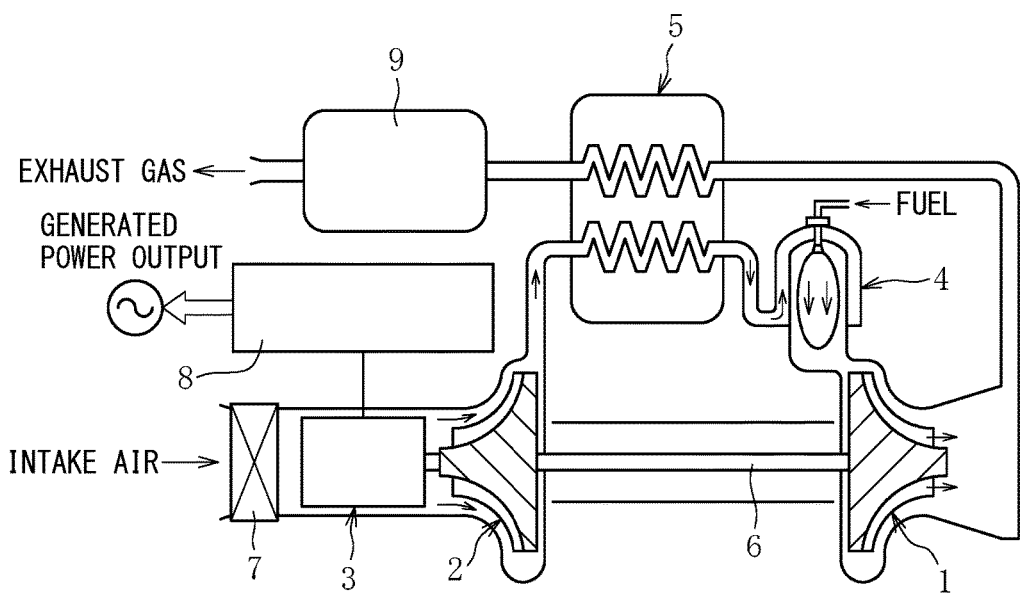
FIG. 1 is a view for illustrating a schematic configuration of a micro gas turbine.

In FIG. 1, a configuration of a gas turbine device which is called a "micro gas turbine" is conceptually illustrated as one example of a turbo-machine. This gas turbine device comprises, as a main configuration, a turbine 1 forming a blade cascade, a compressor 2, a power generator 3, a combustor 4, and a regenerator 5. The turbine 1 and the compressor 2 are mounted to a shaft 6 extending in a horizontal direction to construct a rotor on a rotary side together with the shaft 6. One end of the shaft 6 in an axial direction thereof is coupled to the power generator 3. When this micro gas turbine is operated, air is taken in through an intake port 7. The taken-in air is compressed by the compressor 2 and heated by the regenerator 5, and thereafter sent to the combustor 4. The combustor 4 mixes fuel into the compressed and heated air and combusts mixture of fuel and the air, to thereby generate high-temperature and high-pressure gas and rotate the turbine 1 with this gas. When the turbine 1 is rotated, a rotary force thereof is transmitted to the power generator 3 through the shaft 6, to thereby drive the power generator 3 to rotate. Power generated by driving the power generator 3 to rotate is output through an inverter 8. Temperature of the gas after the rotation of the turbine 1 is relatively high. Thus, the gas is delivered to the regenerator 5 to perform heat exchange with compressed gas before combustion, thereby reusing the heat of the gas after combustion. The gas after completion of the heat exchange in the regenerator 5 passes through a waste heat collecting device 9, and is then discharged as exhaust gas.

Figure 2:
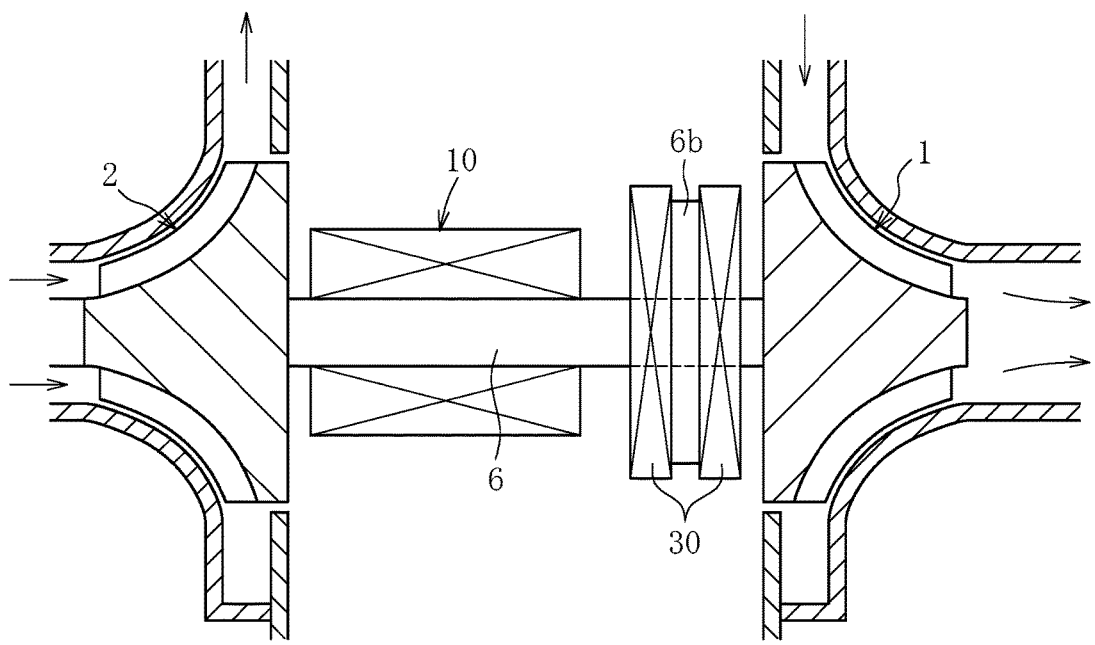
FIG. 2 is a view for illustrating a schematic configuration of a rotor support structure in the micro gas turbine.

In FIG. 2, one example of a support structure for the rotor in the micro gas turbine illustrated in FIG. 1 is conceptually illustrated. In this support structure, radial bearings 10 are arranged near the shaft 6, and thrust bearings 30 are arranged on both sides of a flange portion 6b in an axial direction thereof, the flange portion 6b being arranged on the shaft 6. The shaft 6 is supported by these radial bearings 10 and thrust bearings 30 rotatably in both the radial direction and the thrust direction. In this support structure, a region between the turbine 1 and the compressor 2 has a high-temperature atmosphere because the region is adjacent to the turbine 1, which is rotated by the high-temperature and high-pressure gas. In addition, the shaft 6 is rotated at a rotation speed of several ten thousand rpm or higher. Therefore, as the bearings 10 and 30 to be used in this support structure, air dynamic pressure bearings or, in particular, foil bearings are suitable.

As an example of a foil bearing which is suitable for the radial bearing 10 to be used for the above-mentioned micro gas turbine, a foil bearing of a so-called multi-arc type is used. Now, description is made of a basic configuration of the multi-arc type foil bearing with reference to FIG. 3 to FIG. 8.

[Basic Configuration of Multi-Arc Type Foil Bearing]

Figure 3:
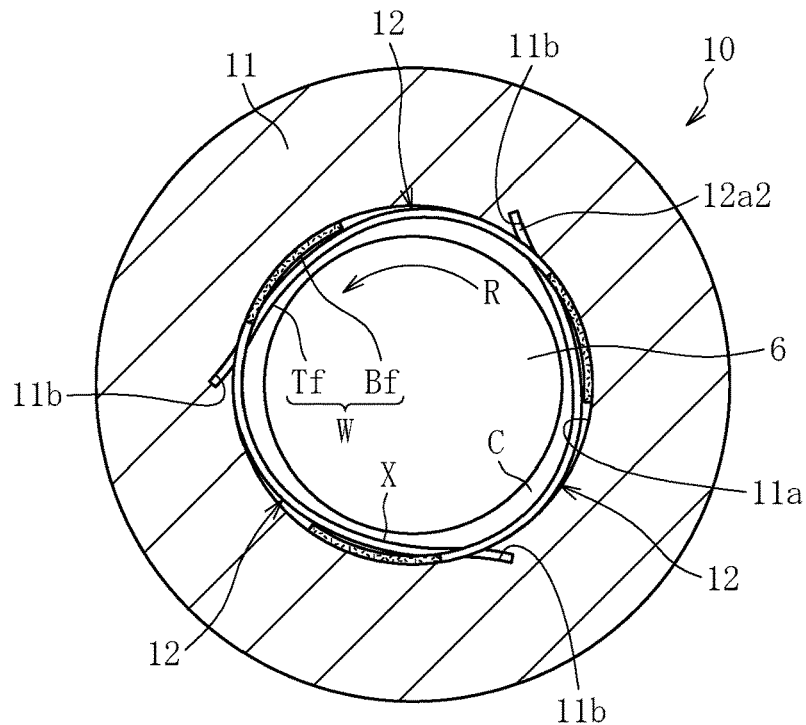
FIG. 3 is a sectional view for illustrating a foil bearing according to an embodiment of the present invention.

As illustrated in FIG. 3, the multi-arc type radial foil bearing 10 comprises a foil holder 11 and foils 12. The foil holder 11 has an inner peripheral surface 11a having a cylindrical surface shape. The foils 12 are arranged at a plurality of positions in a rotation direction of the shaft 6 on the inner peripheral surface 11a of the foil holder 11. The foil bearing 10 of the illustrated example is an example in which the foils 12 are arranged at three positions on the inner peripheral surface 11a. The shaft 6 is inserted on a radially inner side of the foils 12.

The foil holder 11 may be made of metal (for example, steel material) such as sintered metal or ingot material. At a plurality of positions (the same number as the number of foils) apart from each other in a rotation direction R in the inner peripheral surface 11a of the foil holder 11, there are formed axial grooves 11b serving as mounting portions for the foils 12.

Foil members forming the foils 12 are each formed by processing a band-shaped foil having a thickness of from about 20 μm to about 200 μm, which is made of metal having sufficient resiliency and exhibiting high processability such as steel material or copper alloy, into a predetermined shape, for example, by press working. As a representative example of steel material or copper alloy, carbon steel or brass may be given. However, with the general carbon steel, a rust-prevention effect with oil cannot be expected due to absence of lubricating oil in the atmosphere, with the result that corrosion caused by rust is liable to occur. Further, with the brass, there is a case in which delayed crack is formed due to machining strain (as the amount of Zn contained in the brass is larger, such tendency becomes more conspicuous). Therefore, it is preferred that a band-shaped foil made of stainless steel or bronze be used.

Figure 4:
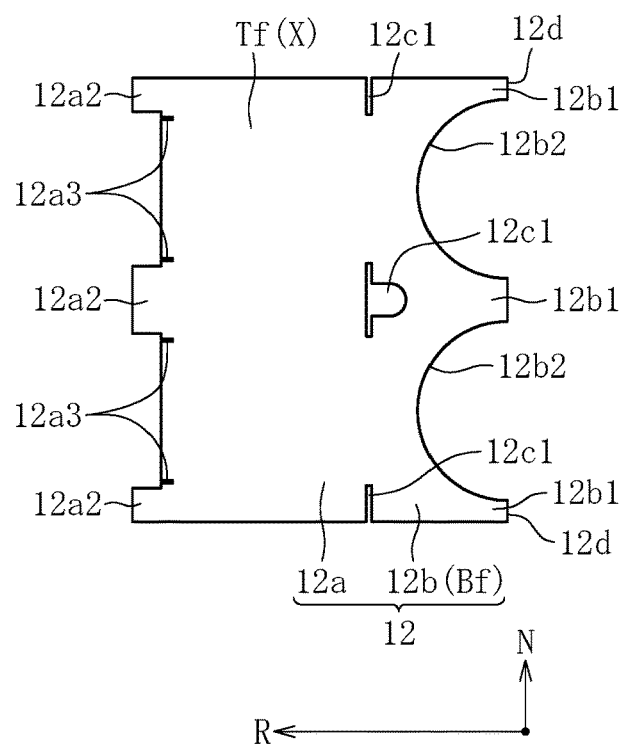
FIG. 4 is a plan view of a foil.

As illustrated in FIG. 4, the foil 12 comprises a first region 12a on the rotation direction R side of the shaft 6 and a second region 12b on the side opposite to the rotation direction side.

The first region 12a comprises a top foil portion Tf and protruding portions 12a2. The top foil portion Tf forms a bearing surface X. The protruding portions 12a2 are formed at a plurality of positions in a direction N extending along a surface of the top foil portion Tf and being orthogonal to the rotation direction R (hereinafter simply referred to as "orthogonal direction N"), and protrude toward the rotation direction R side. In this embodiment, illustration is given of the case in which the protruding portions 12a2 are formed at three positions along the orthogonal direction. At base end portions of the protruding portions 12a2, there are formed minute slits 12a3 extending from foil edge portions in a direction opposite to the rotation direction.

At a rear end 12d (end portion on the side opposite to the rotation direction side) of the second region 12b, there are formed two cutout portions 12b2, which are arranged apart in the orthogonal direction N and are recessed in the rotation direction R. A width dimension of each cutout portion 12b2 in the orthogonal direction N gradually decreases toward the rotation direction R. In this embodiment, illustration is given of the case in which each cutout portion 12b2 is entirely formed into an arc shape. However, each cutout portion 12b2 may be formed into a substantially V-shape with a sharp end at a top portion. On both sides of each cutout portion 12b2 in the orthogonal direction N, there are formed protruding portions 12b1 protruding in the direction opposite to the rotation direction.

In a boundary portion between the first region 12a and the second region 12b, and at the plurality of positions (the same number as the number of protruding portions 12a2) in the orthogonal direction N, there are formed insertion slots 12c1 each having a slit shape into which protruding portions 12a2 of an adjacent foil 12 are inserted. Among those, the insertion slots 12c1 at both ends linearly extend in the orthogonal direction N and are opened at both end portions of the foil 12. The insertion slot 12c1 at the center comprises a linear cutout portion and a large-width cutout portion. The linear cutout portion extends along the orthogonal direction N. The large-width cutout portion extends from the cutout portion toward the side opposite to the rotation direction side and has an arc-shaped distal end.

Figure 5:
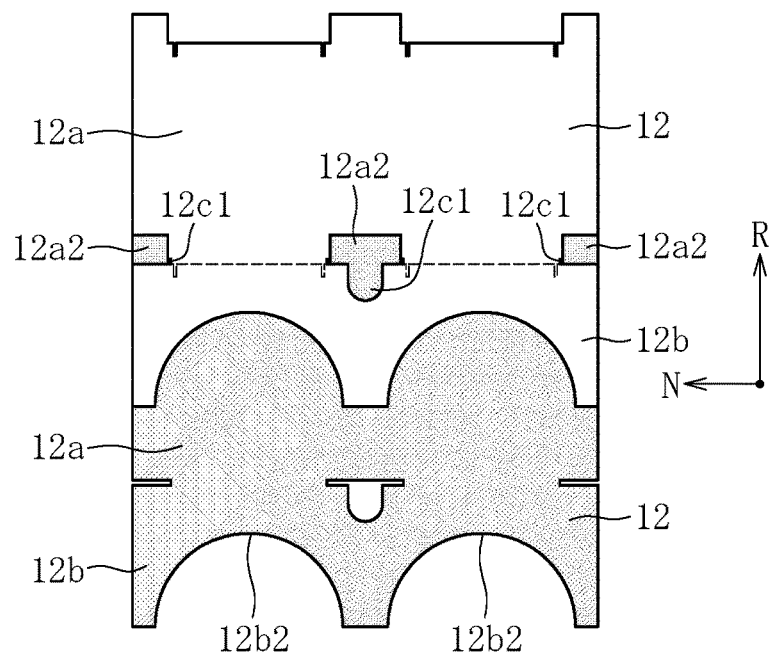
FIG. 5 is a plan view of two foils coupled to each other as seen from a back surface side.

As illustrated in FIG. 5, the protruding portions 12a2 of one foil 12 are inserted into the insertion slots 12c1 of the adjacent foil 12, respectively, thereby being capable of coupling the two foils 12 to each other. In FIG. 5, one foil 12 of the two assembled foils 12 is colored gray.

Figure 6:
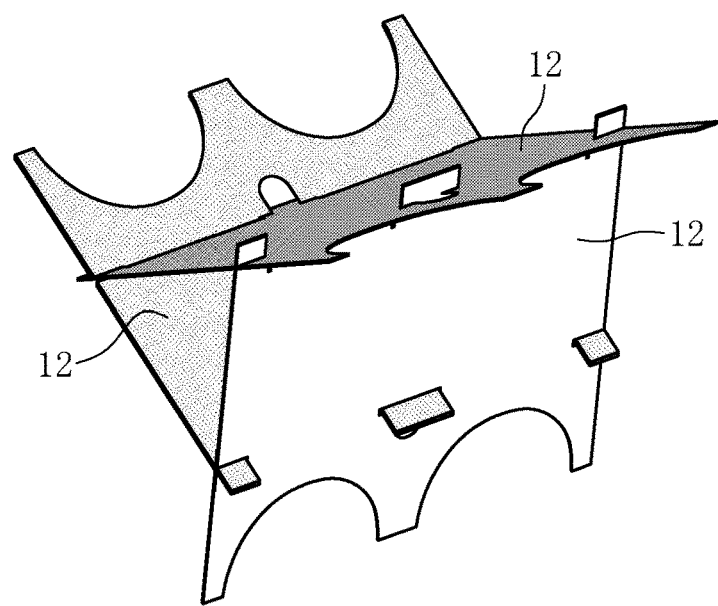
FIG. 6 is a perspective view for illustrating a state in which three foils are temporarily assembled.
Figure 7:
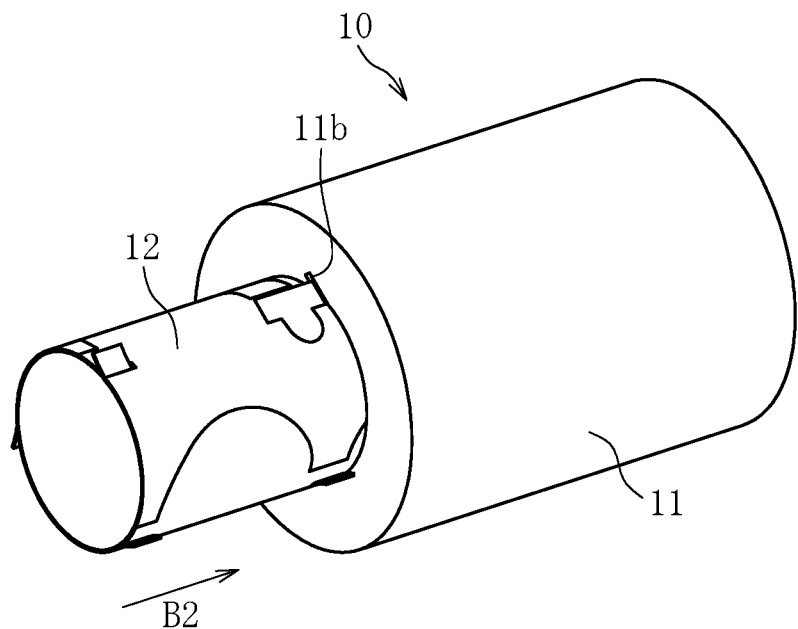
FIG. 7 is a perspective view for illustrating a state of mounting the temporarily assembled body of the foils to a foil holder.

Further, as illustrated in FIG. 6, three foils 12 are coupled to one another to form a shape extending in a circumferential direction by a coupling method similar to that of FIG. 5, thereby being capable of temporarily assembling the foils 12. As illustrated in FIG. 7, the temporarily assembled body is formed into a cylindrical shape, and is inserted along an inner periphery of the foil holder 11 in the direction indicated by the arrow B2. As a result, the foil bearing 10 is assembled. Specifically, while the temporarily assembled body of the three foils 12 is inserted along the inner periphery of the foil holder 11, the protruding portions 12a2 of the foils 12 are inserted into the axial grooves 11b (see FIG. 7) which are opened at one end surface of the foil holder 11 from one side in the axial direction. In the manner as described above, the three foils 12 are mounted to the inner peripheral surface 11a of the foil holder 11 in a state of being arrayed in the rotation direction R.

Figure 8:
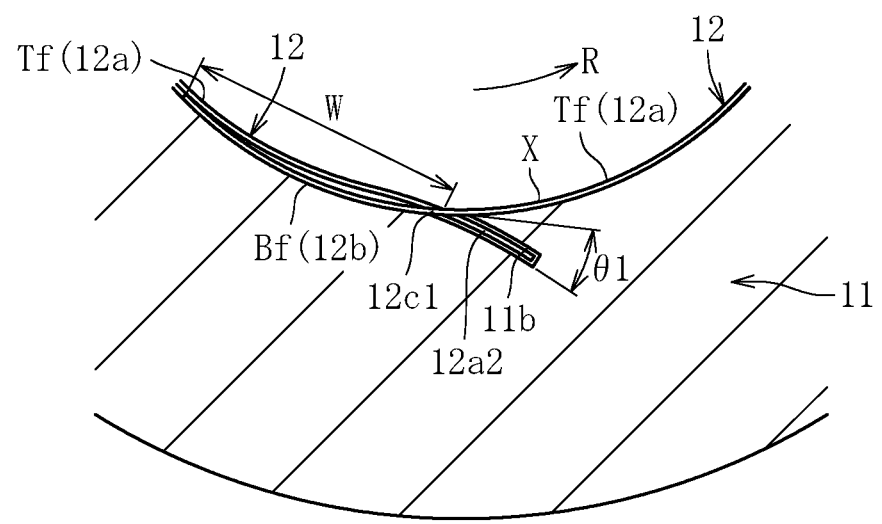
FIG. 8 is an enlarged sectional view for illustrating a foil overlapping portion of the foil bearing.

As illustrated in FIG. 8, under the state in which the foils 12 are mounted to the foil holder 11, the two adjacent foils 12 intersect with each other. On the rotation direction R side from the intersecting portion, the protruding portions 12a2 of one foil 12 extends to the back of another foil 12 through the insertion slots 12c1 of the another foil 12, and are inserted into the axial grooves 11b of the foil holder 11. Moreover, the top foil portion Tf of the another foil 12 forms the bearing surface X. On the side opposite to the rotation direction side from the intersecting portion, the top foil portion Tf of the one foil 12 forms the bearing surface X, and the second region 12b of another foil extends to the back of the one foil 12 to form the back foil portion Bf. The end portion of the back foil portion Bf on the side opposite to the rotation direction side is a free end, and a position of the end portion changes in the circumferential direction (in the rotation direction and the direction opposite to the rotation direction) in accordance with the elastic deformation of the back foil portion Bf. The end portion of the back foil portion Bf on the rotation direction R side is engaged with another foil 12 (one foil described above) at the intersecting portion in the circumferential direction.

At the portion at which the top foil portion Tf and the back foil portion Bf overlap with each other, a foil overlapping portion W at which the foils overlap with each other is formed. The foil overlapping portion W is formed at each of a plurality of positions (the same number as the number of the foils 12, and three positions in this embodiment) in the rotation direction R.

In this foil bearing 10, one end (protruding portions 12a2) on the rotation direction R side of each foil 12 is mounted to the foil holder 11, and the region on the side opposite to the rotation direction side is engaged with another foil 12 in the circumferential direction. With such a configuration, the adjacent foils 12 are held inabutment against each other in the circumferential direction. Thus, the top foil portion Tf of each foil 12 projects toward the foil holder 11 side and is curved into a shape extending along the inner peripheral surface 11a of the foil holder 11. The movement of each foil 12 toward the rotation direction R side is regulated by abutment of the protrusion portions 12a2 of each foil 12 against the axial groove 11b. However, the movement of each foil 12 toward the side opposite to the rotation direction side is not regulated, and hence each foil 12 including the free end of the back foil portion Bf is movable in the direction opposite to the rotation direction.

As illustrated in FIG. 8, the axial groove 11b is formed so as to be slightly inclined by an angle θ1 with respect to a tangential direction of the inner peripheral surface of the foil holder 11. Thus, in the vicinity of the protruding portions 12a2 inserted into the axial groove 11, the top foil portion Tf tends to curve in a direction reverse to an overall curve direction of the foil 12 (curve direction of the inner peripheral surface 11a of the foil holder 11). Moreover, the top foil portion Tf is placed on the back foil portion Bf so as to stand in a state of being inclined in a direction away from the inner peripheral surface 11a of the foil holder 11. Thus, a wedge-shaped space is formed between the bearing surface X of the top foil portion Tf and the outer peripheral surface of the shaft 6. Moreover, the top foil portion Tf is brought into a state of being elastically supported by the back foil portion Bf being elastically deformable.

During rotation of the shaft 6 in one direction, the pressure of an air film generated in the wedge-shaped space is high. Therefore, the shaft 6 receives a floating force. Thus, an annular radial bearing gap C is formed between the bearing surface X of each foil 12 and the shaft 6, and the shaft 6 is rotatably supported in a non-contact state with respect to the foil 12. Through elastic deformation of the top foil portion Tf, the gap width of the radial bearing gap C is automatically adjusted to an appropriate width in accordance with, for example, an operation condition. Thus, the rotation of the shaft 6 is stably supported. In FIG. 3, the gap width of the radial bearing gap C is depicted with emphasis for easy understanding (this similarly applies to FIG. 15, FIG. 19, FIG. 20, and FIG. 22).

During the rotation of the shaft 6, the top foil portion Tf is pressed against the back foil portion Bf by the fluid pressure and is elastically deformed. Therefore, a step of the bearing gap C in the width direction is formed at the top foil portion Tf placed on the back foil portion Bf. As illustrated in FIG. 5, when the cutout portions 12$b$2 are formed at the rear end 12$d$ of the second region 12$b$ of each foil 12, the above-mentioned step is formed into a herring bone shape in conformity with the shape of the cutout portions 12$b$2. The fluid which flows along the top foil portion Tf flows along the above-mentioned step. Therefore, fluid pressure generating portions are formed at two positions in the orthogonal direction N in the bearing gap C. With this, the moment load can be supported while enhancing the floating effect for the shaft 6. In this embodiment, as illustrated in FIG. 4, minute slits 12$a$3 are formed in the top foil portion Tf to reduce the rigidity of the top foil portion Tf. Therefore, when the top foil portion Tf is deformed along the cutout portion 12$b$2, the deformation is smooth.

[Distinctive Feature of the Present Invention]

Figure 9:
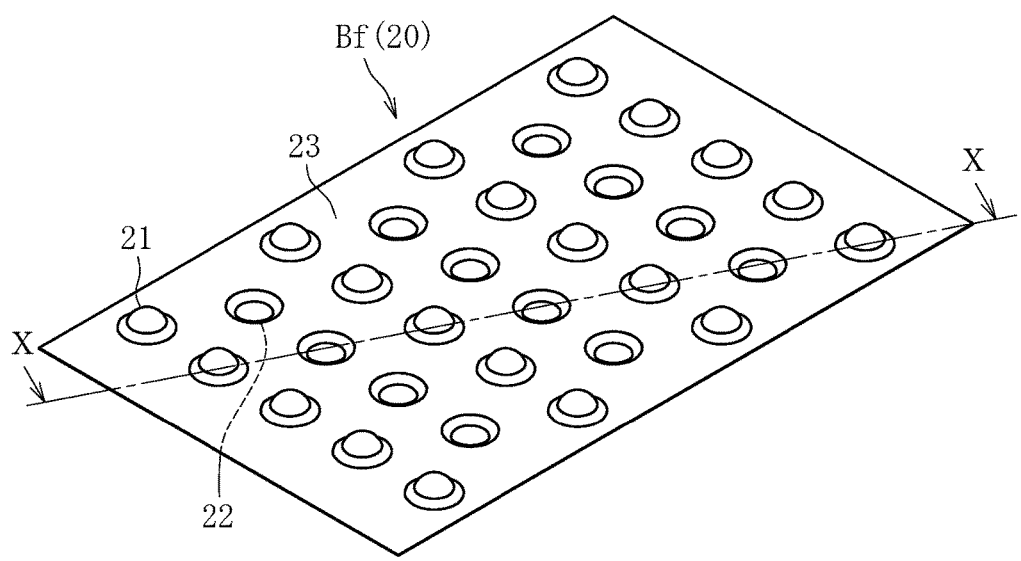
FIG. 9 is a perspective view of a projection-and-recess foil portion.
Figure 10:
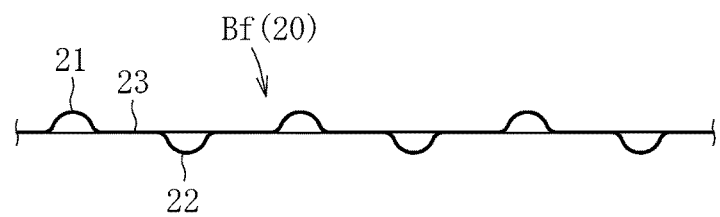
FIG. 10 is a sectional view of the projection-and-recess foil portion.

In the foil bearing 10 described above, the back foil portion Bf of each foil 12 is formed of a projection-and-recess foil 20 illustrated in FIG. 9 and FIG. 10. The projection-and-recess foil 20 integrally comprises a plurality of first projecting portions 21 projecting on the front side of the back foil portion Bf (for example, on the bearing surface X side), a plurality of second projecting portions 22 projecting on the back side (for example, on a side opposite to the bearing surface X), and a flat intermediate portion 23 connecting the projecting portions 21 and 22. The first projecting portions 21 project on the front side from the intermediate portion 23, and the second projecting portions 22 project on the back side from the intermediate portion 23.

Figure 11:
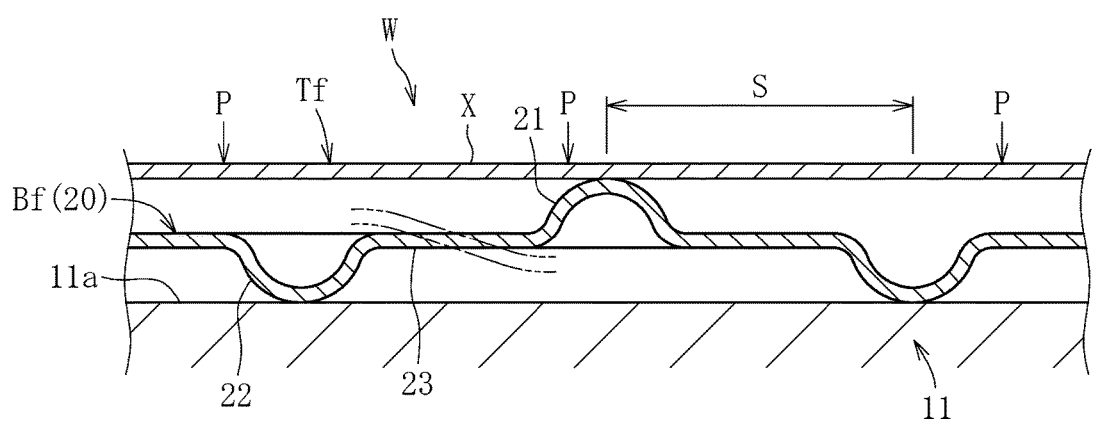
FIG. 11 is an enlarged sectional view of the foil bearing illustrated in FIG. 3 in a developed state.

In FIG. 11, an enlarged cross section of the projection-and-recess foil 20 is illustrated. As illustrated in FIG. 11, the first projecting portions 21, the second projecting portions 22, and the intermediate portion 23 each have an even thickness. The first projecting portions 21 and the second projecting portions 22 each have a substantially semispherical shape. The first projecting portions 21 and the second projecting portions 22 each have a hollow inner shape. Therefore, when the foil 12 is seen from one of the front side and the back side, for example, from the front side, the region in which the second projecting portions 22 are formed has recessed portions.

Figure 12:
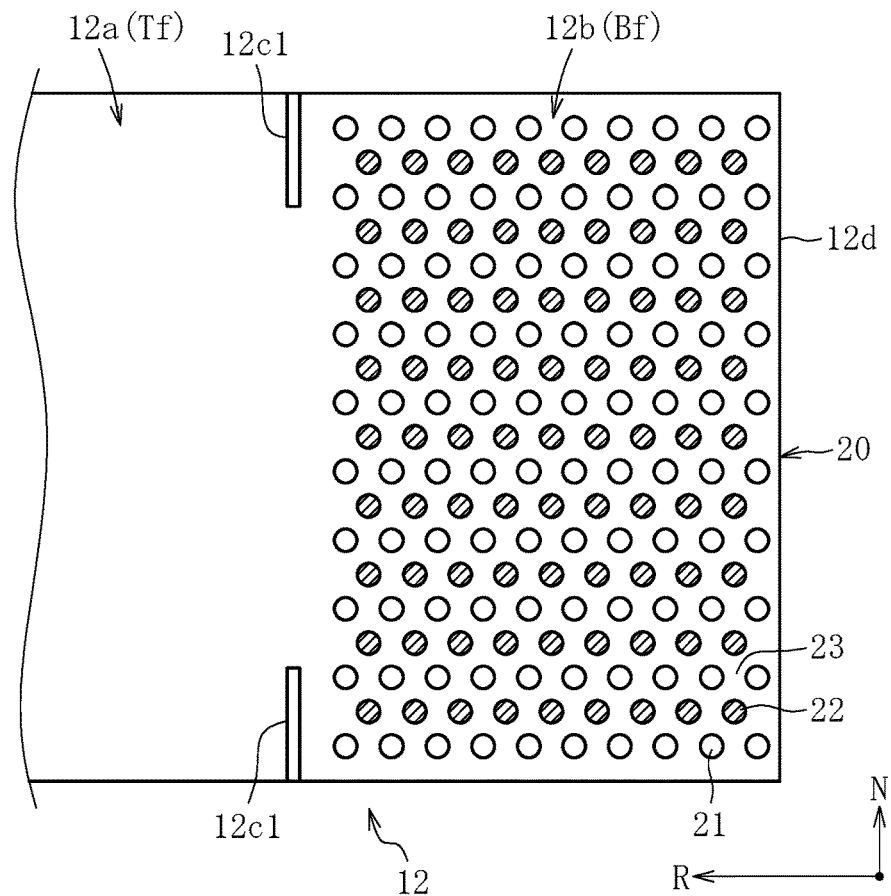
FIG. 12 is a plan view of a foil having the projection-and-recess foil portion.

The projection-and-recess foil 20 is formed by press working on a foil base material. For example, as illustrated in FIG. 4, when the top foil portion Tf and the back foil portion Bf are to be formed in each foil 12, as illustrated in FIG. 12, press working is performed only on the region of the back foil portion Bf to form the first projecting portions 21 (illustrated with outlined circles), the second projecting portions 22 (illustrated with hatched circles), and the intermediate portion 23. In such a manner, the foil 12 integrally comprising the projection-and-recess foil 20 and the smooth top foil portion Tf having no such projections and recesses (in the foil 12 of FIG. 12, the cutout portions 12$b$2 illustrated in FIG. 4 are omitted) can be obtained. The arrangement pattern of the first projecting portions 21 and the second projecting portions 22 illustrated in FIG. 12 is merely an example, and any arrangement pattern different from the one illustrated in FIG. 12 may be employed as needed.

The above-mentioned foils 12 are mounted to the foil holder 11 in the procedure similar to that illustrated in FIG. 5 to FIG. 7. In such a manner, as illustrated in FIG. 3, the radial foil bearing 10 formed of the projection-and-recess foils 20 each having the back foil portion Bf (illustrated in a dispersed dot pattern) is brought to completion. As illustrated in FIG. 11, in this state, the first projecting portions 21 of the back foil portion Bf are held in contact with the top foil portion Tf, and the second projecting portions 22 of the back foil portion Bf are held in contact with the inner peripheral surface 11$a$ of the foil holder 11.

Figure 23:
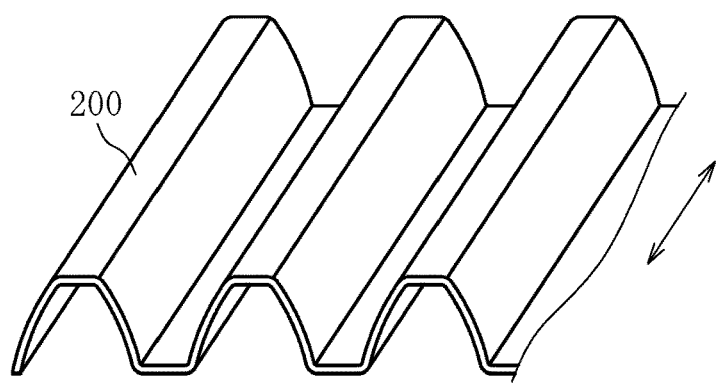
FIG. 23 is a perspective view for illustrating a back foil of a bump-type foil bearing.

During the rotation of the shaft 6, the top foil portion Tf receives a pressure P by an air pressure generated in the bearing gap C. Thus, a compression force in the pressure P direction acts on the back foil portion Bf through the top foil portion Tf. The intermediate portion 23 has a thin-plate shape extending in a direction orthogonal to the pressure P direction. Thus, the intermediate portion 23 is a portion having a low rigidity with respect to the compression force in the back foil portion Bf. Therefore, when the compression force is applied to the back foil portion Bf, as indicated by the two-dot chain lines in FIG. 11, the intermediate portion 23 is first deformed to absorb the compression force. Thus, as compared to a back foil portion of an existing bump-type foil bearing having no such flat portion (see FIG. 23), the rigidity of the back foil portion Bf as a whole can be reduced. With this, the pliability of the bearing surface X is enhanced, and hence the bearing surface X becomes more likely to deform to follow the displacement or the like of the shaft 6, thereby being capable of reliably preventing the contact between the shaft 6 and the top foil portion Tf.

Moreover, as is apparent from FIG. 12, the projecting portions 21 and 22 are arranged in a dispersed manner on the entirety of the back foil portion Bf. Specifically, the contact portions of the projecting portions 21 and 22 with respect to the top foil portion Tf and the foil holder 11 are not formed in a band-like pattern continuing in a certain direction but in a dot-like pattern. That is, the contact portions are formed intermittently at least in orthogonal two directions (for example, the rotation direction R and the orthogonal direction N) along the bearing surface X, more preferably in any directions along the bearing surface X. Thus, when the back foil portion Bf is deformed, the relative movement is allowed also between adjacent projecting portions of the same kind (projecting portions having a common projecting direction from the intermediate portion 23), thereby being capable of further reducing the rigidity of the back foil portion Bf. Incidentally, in the back foil portion of the existing bump-type foil bearing, the protruding portions extend in the axial direction (the orthogonal direction N). Therefore, such relative movement is not allowed between parts in the axial direction of the protruding portion.

Incidentally, it is considered that optimum values of the rigidity required for the bearing surface X vary depending on parts of the bearing surface X. Thus, there is a fear in that mere formation of the entire bearing surface X so as to be pliable may cause insufficiency in rigidity of the bearing surface X at certain parts and degrade the bearing performance.

Figure 13:
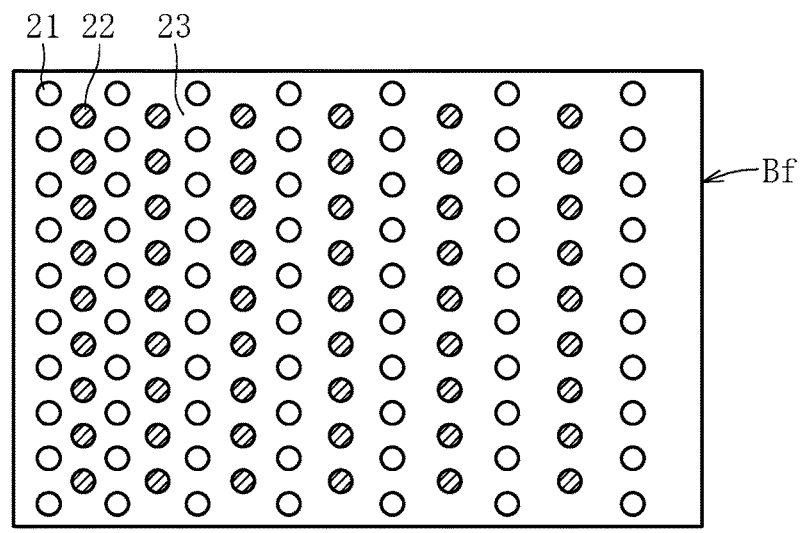
FIG. 13 is a plan view of the projection-and-recess foil portion.

Meanwhile, when the projection-and-recess foils 20 described above are used, the rigidity of the bearing surface X can be partially controlled through variation in distribution density of the first projecting portions 21 and the second projecting portions 22. For example, when a region in which the first projecting portions 21 and the second projecting portions 22 are densely distributed is formed on the back foil portion Bf, a support span S (see FIG. 11) between adjacent projecting portions 21 and 22 is reduced. With such a configuration, the rigidity in this region can be increased. In contrast, when a region in which the projecting portions 21 and 22 are sparsely distributed, the rigidity in this region can be reduced. Thus, as illustrated in FIG. 13, when the back foil portion Bf has the region in which the first projecting portions 21 and the second projecting portions 22 are densely distributed and the region in which the projecting portions 21 and 22 are sparsely distributed, the rigidity at parts of the back foil portion Bf as well as the rigidity at parts of the bearing surface X can be controlled.

Figure 14:
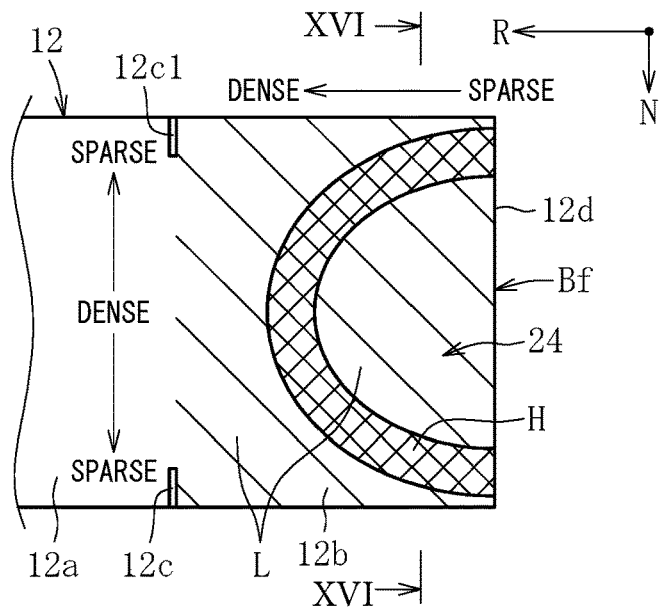
FIG. 14 is a plan view of the foil having the projection-and-recess foil portion.

Now, with reference to FIG. 14, description is made of a specific example in which the rigidity of the bearing surface X is controlled.

FIG. 14 is an illustration of the back foil portion Bf of the foil 12 in which a high-density region H (illustrated with cross-hatching) having the first projecting portions 21 and the second projecting portions 22 which are densely distributed is formed into a band shape and an oval shape. In this case, the projecting portions 21 and 22 are more densely distributed toward the rotation direction R side in the high-density region H, and the projecting portions 21 and 22 are more densely distributed toward the center side from both ends in the orthogonal direction N. In regions of the second region 12b other than the high-density region H, there is formed a low-density region L (illustrated with hatching) in which the projecting portions 21 and 22 are more sparsely distributed than the high-density region H.

Figure 15:
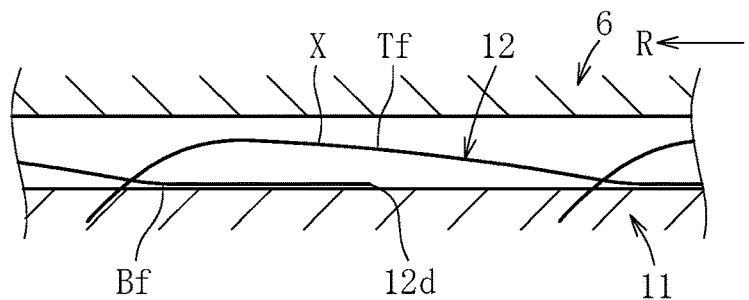
FIG. 15 is a sectional view of the foil bearing illustrated in FIG. 3 in a developed state.
Figure 16:
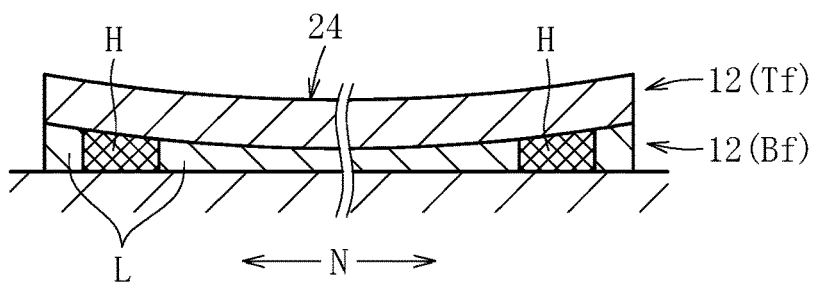
FIG. 16 is a sectional view taken along the line XVI-XVI in FIG. 14.

During the rotation of the shaft 6, as illustrated in FIG. 15, a wedge-shaped space is formed between the top foil portion Tf and the shaft 6 at the foil overlapping portion W. In this case, through formation of the projecting portions 21 and 22 on the back foil portion Bf with the density pattern illustrated in FIG. 13, with the rigidity difference given in the back foil portion Bf, a recessed portion 24 which is recessed at the center portion in the orthogonal direction N is formed in the region of the top foil portion Tf forming the wedge-shaped space as illustrated FIG. 16. On both sides of the recessed portion 24 in the orthogonal direction N, the top foil portion Tf has higher rigidity and is less liable to deform. Thus, the air in the wedge-shaped space is less liable to escape in the orthogonal direction N. Moreover, the pressure is higher on the rotation direction R side in the wedge-shaped space. However, with the rigidity difference given in the back foil portion Bf, the rigidity of the top foil portion Tf is maximum near the maximum pressure portion in the wedge-shaped space. Thus, the air is also less liable to escape from the maximum pressure portion. Therefore, through formation of the projecting portions 21 and 22 on the back foil portion Bf with the density pattern illustrated in FIG. 14, the efficiency in forming the air film in the wedge-shaped space can be enhanced, thereby being capable of reliably preventing the contact between the shaft 6 and the foil 12.

In the related art, as illustrated in FIG. 4, the cutout portions 12b2 are formed at the rear end 12d of the second region 12b serving as the back foil portion Bf to form a portion corresponding to the recessed portion in the wedge-shaped space. However, as long as the rigidity difference is given in the back foil portion Bf as described above, the recessed portion 24 in the similar form can be formed without forming such cutout portion 12b2 at the rear end 12d of the second region 12b. As a matter of course, the density difference of the projecting portions 21 and 22 described above may be given at the second region 12b while forming the cutout portions 12b2 at the rear end 12d of the foil 12.

Figure 17:
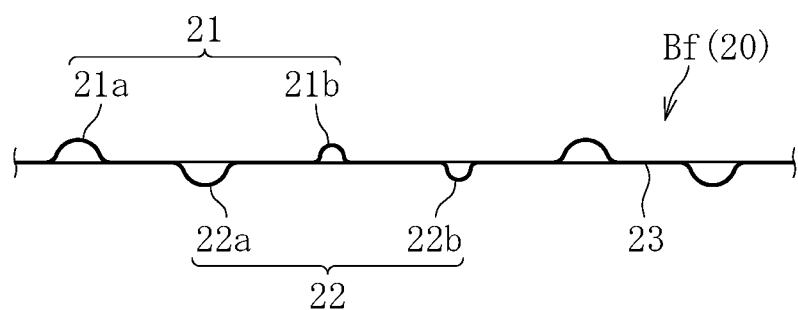
FIG. 17 is a sectional view for illustrating a projection-and-recess foil member in another embodiment of the present invention.

Moreover, in the embodiment described above, all of the first projecting portions 21 and the second projecting portions 22 of the back foil portion Bf have the same size. However, projecting portions having different sizes may be formed on one or both of the front surface and the back surface of the back foil portion Bf. FIG. 17 is an illustration of an example of such configuration. Large projecting portions 21a and small projecting portions 21b are formed as the first projecting portions 21 on the front side, and large projecting portions 22a and small projecting portions 22b are formed as the second projecting portions 22 on the back side. The large projecting portions 21a and 22a and the small projecting portions 21b and 22b are different in projection amount from the intermediate portion 23.

On the back foil portion Bf illustrated in FIG. 17, when the compression force (compression load in the width direction of the bearing gap C) applied to the back foil portion Bf gradually increases, the intermediate portion 23 is deformed, and then the large projecting portions 21a and 22a are deformed. Finally, the small projecting portions 21b and 22b are deformed. Thus, when the compression load is small, the deformation amount of the back foil portion Bf with respect to the increase in load increases. When the compression load is large, the deformation amount of the back foil portion Bf with respect to the increase in load decreases. That is, non-linearity can be given to the resiliency characteristics of the back foil portion Bf.

In the case in which the non-linearity is given to the resiliency characteristics of the back foil portion Bf as described above, when the compression load is small, the top foil portion Tf is likely to deform. Thus, even when the pressure of the air film is low (immediately after start of the rotation of the shaft 6 or immediately before stop of the shaft 6), the wedge-shaped space is likely to be deformed. In contrast, when the compression load is large, the top foil portion Tf is less likely to deform. Thus, even when the pressure of the air film is high (normal rotation state of the shaft 6), the deformation of the top foil portion Bf is suppressed, thereby being capable of preventing leakage of air from the wedge-shaped space. Therefore, irrespective of low-speed rotation and high-speed rotation, the shaft 6 can be stably supported.

Figure 18:
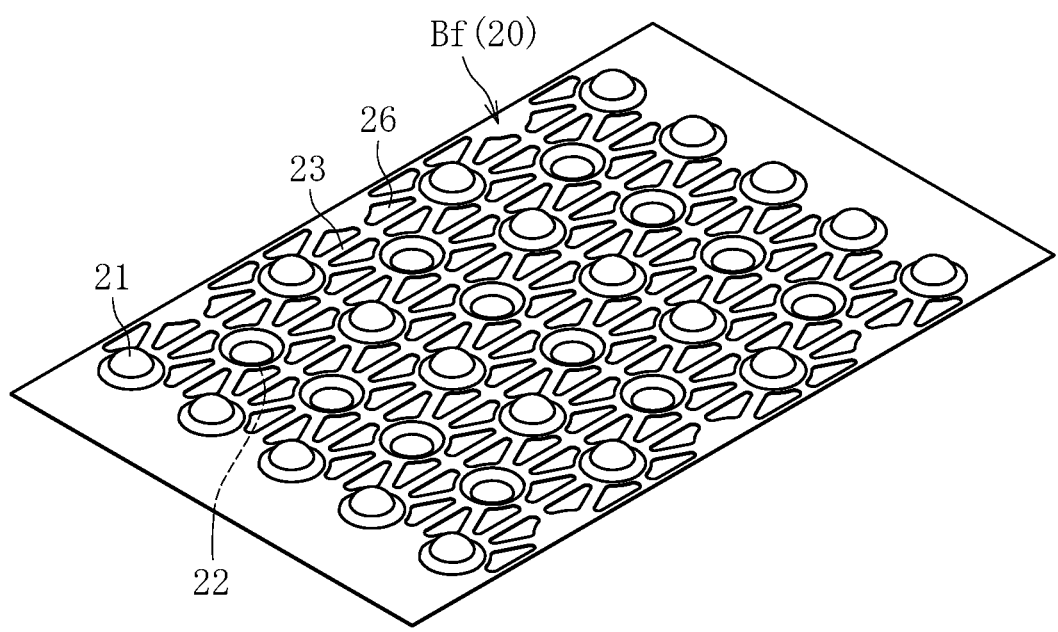
FIG. 18 is a perspective view for illustrating a projection-and-recess foil member in another embodiment of the present invention.
Figure 19:
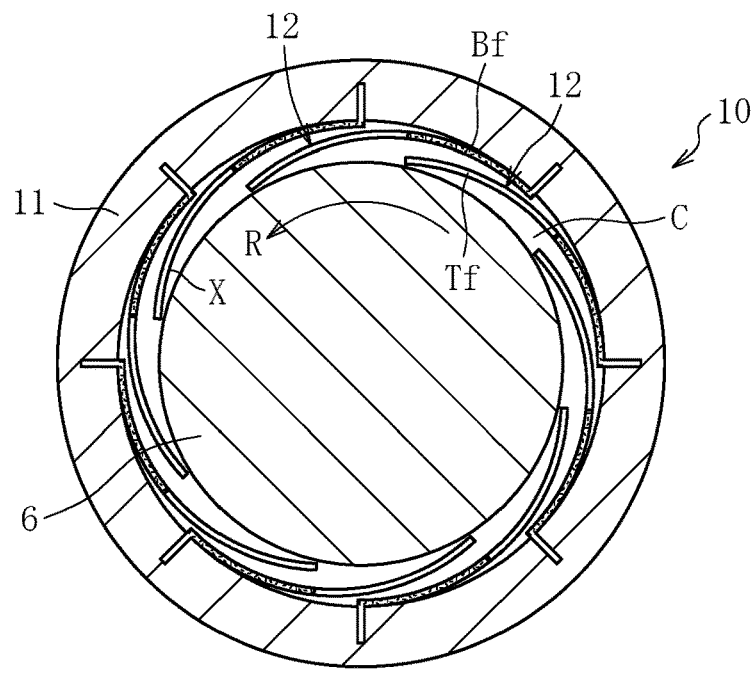
FIG. 19 is a sectional view for illustrating a radial foil bearing of a leaf type.

FIG. 18 is an illustration of a configuration in which a large number of opening portions 26 are formed in the intermediate portion 23 of the back foil portion Bf illustrated in FIG. 9 to reduce the rigidity of the intermediate portion 23. With such a configuration, the intermediate portion 23 becomes more pliable, thereby being capable of further reducing the rigidity of the back foil portion Bf. In the embodiment illustrated in FIG. 18, the intermediate portions 23 extend radially from each of the projecting portions 21 and 22 and are coupled to adjacent projecting portions 21 and 22. In this case, areas and the number of the opening portions 26 are adjusted to change the distribution state of the opening portions 26, thereby being capable of controlling the rigidity of the intermediate portion 23 and the rigidity of the back foil portion Bf at respective parts.

Any one of the structures configured to change the resiliency characteristics of the back foil portion Bf as described above, that is, any one of the structure configured to change the distribution density of the projecting portion 21 and 22 (FIG. 13), the structure configured to change the sizes of the projecting portions 21 and 22 (FIG. 17), and the structure configured to change the distribution state of the opening portions 26 (FIG. 18) is selected, or two or more of the above-mentioned structures are suitably combined, to thereby enable optimization in resiliency characteristics of respective parts of the back foil portion Bf. In such a manner, respective parts of the bearing surface X can be set to optimum rigidities in terms of bearing function, thereby significantly enhancing the freedom in design of the bearing. An example of the projecting portions 21 and 22 each having a semispherical shape (arc shape in cross section) is illustrated. However, the forms of the projecting portions 21 and 22 may be suitably selected, and may be formed into, for example, a polygonal shape in cross section. As described above, the shape (sectional shape) of the projecting portions 21 and 22 may be changed to change the rigidity or resiliency characteristics of the back foil portion Bf.

In the description above, illustration is given of the so-called multi-arc type radial foil bearing as the foil bearing 10 as one example. However, the mode of the foil bearing to which the present invention is applicable is not limited to this. For example, the present invention is applicable also to the radial foil bearing 10 of a so-called leaf type illustrated in FIG. 19. In the leaf-type foil bearing, a plurality of foils 12 (leaves) each having a free end at one end on the rotation direction R side and a fixed end at another end on the side opposite to the rotation direction side are arrayed in the rotation direction R of the shaft 6. A region of each foil 12 on the rotation direction R side functions as the top foil portion Tf, and a region on the side opposite to the rotation direction side functions as the back foil portion Bf. In the radial foil bearing of the leaf type, the back foil portion Bf (illustrated in a dispersed dot pattern) of each leaf 12 is formed of the projection-and-recess foil 20, thereby being capable of attaining the effect similar to the effect described above.

Figure 20:
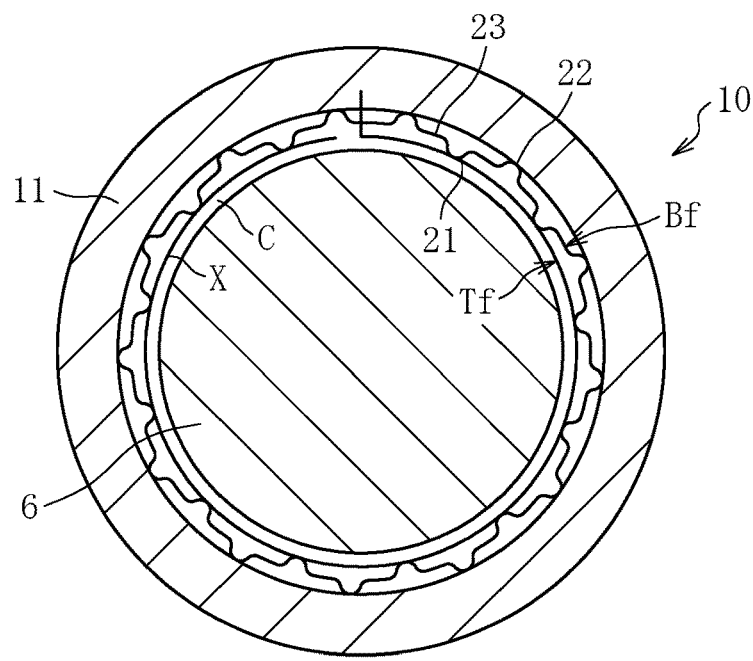
FIG. 20 is a sectional view for illustrating a radial foil bearing of a bump type.

Moreover, the present invention is applicable also to the radial foil bearing 10 of the so-called bump type illustrated in FIG. 20. In the foil bearing 10 of the bump type, the entirety of the back foil portion Bf is formed of the projection-and-recess foil 20, thereby being capable of attaining the effect similar to the effect described above. In FIG. 20, the back foil portion Bf continues on the entire circumference of the inner peripheral surface 11a of the foil holder 11. However, the back foil portion Bf can be divided at one position or at a plurality of positions in the circumferential direction. In this case, each of the divided elements is formed of the projection-and-recess foil 20.

Figure 21:
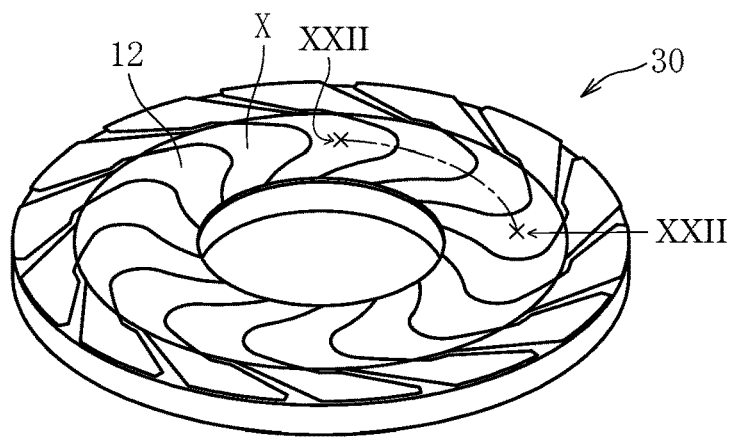
FIG. 21 is a perspective view for illustrating a thrust foil bearing of a leaf type.
Figure 22:
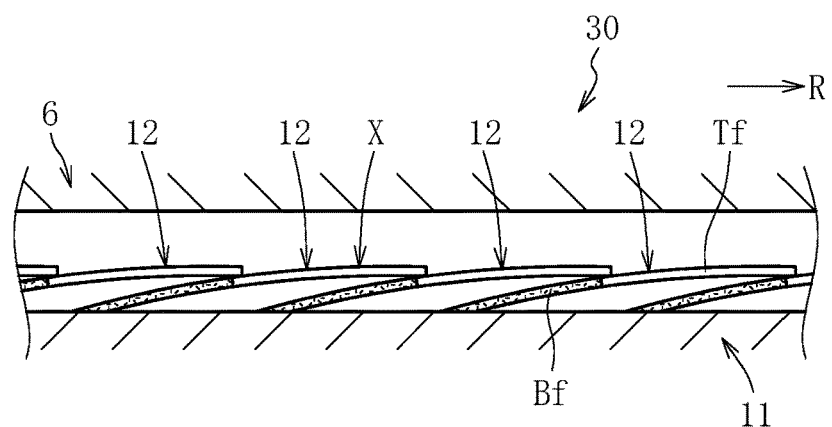
FIG. 22 is a sectional view taken along the line XXII-XXII in FIG. 21.

Further, the present invention is applicable also to a thrust foil bearing 30 illustrated in FIG. 21. FIG. 21 is an illustration of a thrust foil bearing of a leaf type as an example of the thrust foil bearing 30. Also in this thrust foil bearing, as illustrated in FIG. 22, the back foil portion Bf (illustrated in a dispersed dot pattern) of each leaf 12 is formed of the projection-and-recess foil 20, thereby being capable of attaining the effect similar to the effect described above.

In the description above, description is made of an exemplary case in which the shaft 6 is a rotary side member and the foil holder 11 is a stationary side member. However, in contrast, the present invention can be applied also to the case in which the shaft 6 is the stationary side member and the foil holder 11 is the rotary side member. However, in this case, the foil 12 is the rotary side member, and hence it is required that the foil 12 be designed in consideration of deformation of the entire foil 12 caused by a centrifugal force.

Moreover, the foil bearing according to the present invention can be used not only as a foil bearing for the above-mentioned gas turbine but also as, for example, a foil bearing for supporting a rotor of turbomachinery such as a supercharger. The present invention is not limited to the examples described above, and the foil bearing according to the present invention can be widely used as a bearing for vehicles such as automobiles as well as a bearing for an industrial device. Moreover, the foil bearings of the embodiments are air dynamic pressure bearings using air as pressure-generating fluid. However, the present invention is not limited thereto, and other gas can be used as the pressure-generating fluid. Alternatively, liquid such as water or oil can also be used.

REFERENCE SIGNS LIST 6 shaft
10 foil bearing
11 foil holder
11a inner peripheral surface
11b axial groove (mounting portion)
12 foil
20 projection-and-recess foil
21 first projecting portion
21a large projecting portion
21b small projecting portion
22 second projecting portion
22a large projecting portion
22b small projecting portion
23 intermediate portion
C bearing gap
R rotation direction
N direction orthogonal to rotation direction
X bearing surface

The invention claimed is:

1. A foil bearing comprising:
a top foil portion having a bearing surface opposed to a shaft to be supported; and
a back foil portion, which is arranged on a back of the top foil portion, and is configured to elastically support the top foil portion,
wherein the foil bearing is configured to support relative rotation of the shaft in a non-contact state with a fluid film generated in a bearing gap between the shaft and the bearing surface,
wherein the back foil portion comprises:
an intermediate portion that is flat;
first projecting portions projecting on a front side of the intermediate portion; and
second projecting portions projecting on a back side of the intermediate portion, and
wherein the intermediate portion is provided between the first projecting portions and the second projecting portions.

2. The foil bearing according to claim 1, wherein the first projecting portions and the second projecting portions are arrayed intermittently at least in a relative rotation direction of the shaft and in a direction orthogonal to the relative rotation direction along the bearing surface.

3. The foil bearing according to claim 2, wherein the back foil portion comprises:
  a high-density region in which the first projecting portions and the second projecting portions are densely distributed; and
  a low-density region in which the first projecting portions and the second projecting portions are sparsely distributed.

4. The foil bearing according to claim 3, wherein the first projecting portions, the second projecting portions, or both the first projecting portions and the second projecting portions comprise:
  large projecting portions each having a large projection amount from the intermediate portion; and
  small projecting portions each having a small projection amount from the intermediate portion.

5. The foil bearing according to claim 4, wherein the intermediate portion has an opening portion.

6. The foil bearing according to claim 2, wherein the first projecting portions, the second projecting portions, or both the first projecting portions and the second projecting portions comprise:
  large projecting portions each having a large projection amount from the intermediate portion; and
  small projecting portions each having a small projection amount from the intermediate portion.

7. The foil bearing according to claim 6, wherein the intermediate portion has an opening portion.

8. The foil bearing according to claim 3, wherein the intermediate portion has an opening portion.

9. The foil bearing according to claim 2, wherein the intermediate portion has an opening portion.

10. The foil bearing according to claim 2, wherein the back foil portion has a maximum rigidity at a position corresponding to a maximum pressure generating portion in the bearing gap.

11. The foil bearing according to claim 1, wherein the back foil portion comprises:
  a high-density region in which the first projecting portions and the second projecting portions are densely distributed; and
  a low-density region in which the first projecting portions and the second projecting portions are sparsely distributed.

12. The foil bearing according to claim 11, wherein the first projecting portions, the second projecting portions, or both the first projecting portions and the second projecting portions comprise:
  large projecting portions each having a large projection amount from the intermediate portion; and
  small projecting portions each having a small projection amount from the intermediate portion.

13. The foil bearing according to claim 12, wherein the intermediate portion has an opening portion.

14. The foil bearing according to claim 11, wherein the intermediate portion has an opening portion.

15. The foil bearing according to claim 11, wherein the back foil portion has a maximum rigidity at a position corresponding to a maximum pressure generating portion in the bearing gap.

16. The foil bearing according to claim 1, wherein the first projecting portions, the second projecting portions, or both the first projecting portions and the second projecting portions comprise:
  large projecting portions each having a large projection amount from the intermediate portion; and
  small projecting portions each having a small projection amount from the intermediate portion.

17. The foil bearing according to claim 16, wherein the intermediate portion has an opening portion.

18. The foil bearing according to claim 16, wherein the back foil portion has a maximum rigidity at a position corresponding to a maximum pressure generating portion in the bearing gap.

19. The foil bearing according to claim 1, wherein the intermediate portion has an opening portion.

20. The foil bearing according to claim 1, wherein the back foil portion has a maximum rigidity at a position corresponding to a maximum pressure generating portion in the bearing gap.

* * * * *